United States Patent Office 3,560,146
Patented Feb. 2, 1971

3,560,146
PROCESS FOR IMPROVING THE STEREO-
SPECIFICITY OF CATALYTIC COMPONENTS
COMPRISING TiCl₃
Luciano Luciani and Gianfranco Corsi, Ferrara, Italy,
assignors to Montecatini Edison S.p.A., Milan, Italy
No Drawing. Filed Aug. 4, 1967, Ser. No. 658,319
Claims priority, application Italy, Aug. 9, 1966,
18,418/66
Int. Cl. C01b 9/02
U.S. Cl. 23—87         6 Claims

ABSTRACT OF THE DISCLOSURE

Process for improving stereospecificity of $TiCl_3$ containing catalyst wherein $TiCl_3$ composition is obtained by reducing $TiCl_4$ with Al or $H_2$ and thereafter activating by vigorous milling at ambient temperature for from about 4 to 24 hours, this process comprising thereafter intimately admixing $TiCl_3$ composition with from about 1–12% by weight thereof of a halogenated or non-halogenated aromatic hydrocarbon at below 60° C. for between about 30 minutes and 4 hours.

BACKGROUND OF THE INVENTION

(1) Field of the invention

The present invention relates to a process for the preparation of $TiCl_3$ in order to obtain highly stereospecific systems suitable for the low pressure polymerization of alpha-olefins. More particularly it relates to an improvement in the process of activation of crystalline compositions obtained by reduction of $TiCl_4$ with aluminum metal or with hydrogen.

(2) Description of the prior art

Processes for the stereospecific polymerization of alpha-olefins, yielding polymers having high crystallinity, are known in the art (U.S. Pats. 3,197,452; 3,141,872; 3,112,-300; 3,112,301; 2,882,263; and U.S. Pat. applications 602,036; 571,114, etc.). These processes are carried out at relatively low pressures, in the presence of catalytic systems consisting of a compound of a transition metal, preferably having a valence state lower than the maximum one, and organometallic compounds of elements belonging to Groups I, II and III of the Periodic Table. Particularly valuable results are obtained, e.g., by the use of catalytic systems comprising $TiCl_3$ and aluminum organometallic compounds (U.S. Pats. 3,197,452; 3,141,872; 3,112,300; 3,112,301; etc.). Various methods for the preparation of violet $TiCl_3$, which is a component of such catalytic systems, have been described. One of these methods comprises reducing $TiCl_4$ with aluminum metal, which reduction leads to a crystalline composition containing $TiCl_3$ and $AlCl_3$ in a ratio of 3:1. This violet $TiCl_3$ is characterized by a particular X-ray diffraction spectrum and shows, depending upon the preparation temperature, the structure of alpha $TiCl_3$ or of γ $TiCl_3$, as defined by Natta and his coworkers (J. of Polymer Science 51, 389–410, (1961)).

An increase of the stereospecificity of the catalytic system for the polymerization of alpha-olefins can be attained by subjecting the crystalline composition to an activation by strong milling, until a product is obtained which has an X-ray diffraction spectrum characteristic of the δ-form of $TiCl_3$, as described by Natta and his co-workers (J. Polymer Science 51, 399–410 (1961)). As is known, this line is a sure index of the disorder situation among successive layers of the structure of $TiCl_3$. Generally, this activation operation by milling is carried out in rotating-hammer mills or in centrifugal mills, although other milling devices may be suitably used.

A process has been described recently according to which it is possible to attain an improvement of the stereospecificity of catalytic systems for the polymerization of alpha-olefins, which catalytic systems include $TiCl_3$ obtained by reducing $TiCl_4$ with aluminum metal at 200° C. and removal of the excess $TiCl_4$ by distillation. In accordance with this proposal, the $TiCl_3$ is activated by strong milling at room temperature, and in a mixed state, in the presence of from about 4 to 13% by weight, based on the weight of the crystalline composition, of an aromatic hydrocarbon, e.g., benzene, or a derivative thereof which is mono- or polyhalogenated in the ring, for example, o-dichlorobenzene or bromobenzene. However, this process, while providing an effective improvement of the stereospecificity of the catalytic system, leads to a decrease of the polymerization rate when using this catalytic system.

SUMMARY OF THE INVENTION

We have now surprisingly found that it is possible to obtain an increase of the stereospecificity of the catalytic system for the polymerization of the alpha-olefins, while at the same time keeping the polymerization rate practically unchanged, when the addition of the aromatic hydrocarbon, optionally mono- or polyhalogenated in the ring, is carried out at the end of the activation milling operation by a simple homogenization operation in order to allow an efficient contact among the surfaces of the substances present.

The process of the present invention allows carrying out of the milling under remarkably better conditions by avoiding the drawbacks connected with the presence of a liquid substance which, as can be easily understood, always exerts to some degree, depending upon the type and the amount thereof, a plasticizing action. In addition, this process can be applied to different kinds of $TiCl_3$ obtained in whatever way, that is to those obtained, e.g., either by reduction of $TiCl_4$ with aluminum metal (either in excess liquid reagent, or in the presence of solvent, or dry, using stoichiometric amounts of reagents), or by reduction with $H_2$.

The present invention therefore provides a process for improving the sterospecificity of a catalytic component used for the polymerization of alpha-olefins and consisting of a crystalline composition of violet $TiCl_3$ obtained by reduction of $TiCl_4$ with metal Al or with $H_2$ and successive activation by strong milling at room temperature for a time of from about 4 to 24 hours, this process comprising, after said activation, intimately admixing the crystalline composition with an aromatic hydrocarbon compound, which may or may not be mono- or polyhalogenated in the ring, said compound being added in amounts of from about 1 to 12%, preferably from about 2 to 8% by weight, based on the weight of the crystalline composition, and the homogenization or intimate admixing being carried out at temperatures below 60° C. for at least 30 minutes, preferably between about 1 and 2 hours. If desired, longer mixing times may be employed, although this is neither necessary nor helpful.

DESCRIPTION OF THE PREFERRED EMBODIMENTS

Preferred aromatic hydrocarbons and their derivatives which are mono- and polyhalogenated in the ring and which can be suitably used in the process of the present invention include benzene, toluene, naphthalene, bromobenzene, chlorotoluene, chloro-naphthalene, o-dichlorobenzene, p-dichlorobenzene, etc. The homogenization of these compounds with the crystalline composition comprising activated $TiCl_3$ can be carried out in the same mill wherein the activation was carried out, but also can be suitably carried out in other devices known in the art for efficiently intimately contacting and mixing liquid and solid substances.

The following examples are presented to illustrate the invention without in any way limiting its scope. In order to evaluate the activity of the crystalline compositions obtained in the examples, a propylene polymerization test was carried out under the following conditions: Into a 5 liter autoclave, provided with a comb stirrer, were added 2 liters of n-heptane, as solvent, 1.6 g. of crystalline composition of $TiCl_3$ (obtained as hereinafter described in Examples 1–5), 3.1 g. of $AlEt_2Cl$ and finally a gaseous mixture consisting of propylene and hydrogen (containing 0.5–0.7% by volume of hydrogen based on the propylene) at a pressure of 7 atm. The polymerization was carried out for 3.5 hours at a temperature of 70° C. and a constant pressure of 7 atm. (maintained with suitable feeding of the propylene-hydrogen mixture). At the end of the polymerization, the polymeric suspension was discharged and subjected to steam distillation until all of the solvent was removed. The polymer was thereafter dried under vacuum at 80° C. for 16 hours.

The starting $TiCl_3$ was the δ-type, obtained by reduction of $TiCl_4$ with aluminum metal and successive activation by strong milling or by reduction of $TiCl_4$ with $H_2$ and successive activation by strong milling. The yields are based on the grams of polypropylene obtained per each gram of $TiCl_3$ composition, per each polymerization hour.

Example 1

In a centrifugal mill of the Locke type, mod. 1, provided with two 2-liter steel pars, each containing 2 kg. of steel balls of 16 mm. diameter, the homogenization of 160 g. of a crystalline composition of δ-form $TiCl_3$ was carried out with various amounts of o-chlorobenzene, as set forth in Table 1, at a temperature of 25° C., for 30 minutes.

The products thus obtained were successively used as catalytic components in a series of standard polymerization runs, the results of which are reported in Table 1 as a function of the amount of o-dichlorobenzene used in the homogenization treatment.

TABLE 1

| o-Dichlorobenzene, (percent) | Polypropylene yield, g./g./h. | Intrinsic viscosity [η] dl./g. | Isotacticity index, (percent) |
|---|---|---|---|
| ---------- | 210 | 2.3 | 89.0 |
| 1.0 | 200 | 2.8 | 92.5 |
| 2.5 | 207 | 4.1 | 94.5 |
| 4.0 | 221 | 1.9 | 93.5 |
| 6.0 | 218 | 2.8 | 94.0 |
| 8.0 | 180 | 2.8 | 94.5 |
| 12.0 | 194 | 2.4 | 94.5 |

Using p-dichlorobenzene, instead of ortho-dichlorobenzene, the following results were obtained

| | | | |
|---|---|---|---|
| ---------- | 190 | 2.5 | 91.0 |
| 4 | 200 | 2.8 | 94.0 |
| 8 | 210 | 2.4 | 95.5 |

NOTE.—[η] was measured in tetrahydronaphthalene at 135° C.

Example 2

In a 7.7 liter mill provided with steel drum of 20 cm. diameter containing 19 kg. of steel balls of 16 mm. diameter, the homogenization of 550 g. of a crystalline composition of δ-form $TiCl_3$ with 8% by weight thereof of o-dichlorobenzene was carried out in the course of several runs, at room temperature and with the mill revolving at a rate of 66 r.p.m. for variable times, as set forth in Table 2.

The results obtained by using a catalytic system comprising the thus obtained product in a series of polymerization runs are reported in Table 2 as a function of the homogenization time.

TABLE 2

| o-Dichlorobenzene, percent | Homogenization time, minutes | Polypropylene yield, g./g./h. | Intrinsic viscosity | Isotacticity index, percent |
|---|---|---|---|---|
| ---------- | | 144 | 2.2 | 91.5 |
| 8.0 | 5 | 146 | 1.8 | 92.0 |
| 8.0 | 15 | 165 | 1.7 | 93.0 |
| 8.0 | 30 | 154 | 2.4 | 94.5 |
| 8.0 | 60 | 124 | 2.4 | 94.5 |
| 8.0 | 120 | 167 | 2.3 | 94.0 |
| 8.0 | 240 | 165 | 2.1 | 95.0 |

Example 3

The homogenization of 150 g. of a crystalline composition of α-form $TiCl_3$ with variable amounts of benzene was carried out, in the course of several runs, in the Locke centrifugal mill, described in Example 1, at a temperature of 25° C. and for 30 minutes.

The product thus obtained was used as a catalytic component in a series of standard polymerization runs, the results of which are reported in Table 3 as a function of the amounts of benzene used.

TABLE 3

| Benzene, percent | Polypropylene yield, g./g./h. | Intrinsic viscosity | Isotacticity index, percent |
|---|---|---|---|
| ---------- | 243 | 2.2 | 92.5 |
| 2.0 | 240 | 2.2 | 94.0 |
| 4.0 | 270 | 1.6 | 94.5 |
| 8.0 | 225 | 2.1 | 94.5 |

Example 4

In the drum mill described in Example 2, the homogenization of 550 g. of a crystalline composition of δ-form $TiCl_3$ with 8% by weight of benzene was carried out in a series of runs at a temperature of 25° C. and for variable times.

The product thus obtained was used as a catalytic component in a series of standard polymerization runs, the results of which are reported in Table 4 as a function of the homogenization time.

TABLE 4

| Benzene, percent | Homogenization time, minutes | Polypropylene yield, g./g./h. | Intrinsic viscosity | Isotacticity index, percent |
|---|---|---|---|---|
| ---------- | | 196 | 1.9 | 91.0 |
| 8.0 | 30 | 215 | 1.8 | 92.5 |
| 8.0 | 60 | 194 | 2.1 | 95.0 |
| 8.0 | 120 | 220 | 1.7 | 94.5 |

Example 5

The homogenization of 12.5 kg. of a crystalline composition of α-form $TiCl_3$ with 6% by weight of o-dichlorobenzene or of benzene, was carried out, in successive runs, in a 200 liter steel drum-mill having a diameter of 60 cm. and containing 400 kg. of steel balls of 25 mm. diameter, at room temperature, for 2 hours, with the mill revolving at a rate of 36 r.p.m. The products thus obtained were successively used as catalytic components in standard polymerization runs, the results of which are reported in Table 5.

TABLE 5

| Benzene, percent | o-Dichlorobenzene, percent | Polypropylene yield, g./g./h. | Intrinsic viscosity | Isotacticity index, percent |
|---|---|---|---|---|
| ---------- | ---------- | 196 | 1.9 | 91.0 |
| 6.0 | | 210 | 1.9 | 94.5 |
| ---------- | 6.0 | 181 | 2.1 | 94.5 |

Variations can, of course, be made without departing from the spirit and scope of the invention.

Having thus described our invention, what we desire to secure by Letters Patent and hereby claim is:

1. In a process for improving the stereospecificity of a catalytic component for the polymerization of alpha-olefins, said catalytic component being a crystalline violet TiCl₃ composition obtained by reducing TiCl₄ with aluminum metal or with H₂ and thereafter activating said TiCl₃ by vigorous milling at ambient temperature for a time of from about 4 to 24 hours, the improvement which comprises, after said milling, intimately admixing said crystalline violet TiCl₃ composition with from about 1 to 12% by weight, based on the weight of said crystalline composition, of an aromatic compound selected from the group consisting of an aromatic hydrocarbon and an aromatic hydrocarbon having one or more halogen substituents bonded to the aromatic ring, at a temperature below 60° C. for at least 30 minutes.

2. The process of claim 1 wherein from about 2 to 8% by weight of said selected aromatic compound is used.

3. The process of claim 1 wherein said intimate admixing is carried out for a time of between about 1 and 2 hours.

4. The process of claim 1 wherein said aromatic compound is selected from the group consisting of o-dichlorobenzene, paradichlorobenzene, benzene and bromobenzene.

5. The process of claim 2 wherein said aromatic compound is selected from the group consisting of o-dichlorobenzene, paradichlorobenzene, benzene and bromobenzene.

6. A catalytic component comprising TiCl₃ obtained by the process of claim 1.

References Cited

UNITED STATES PATENTS

| | | | |
|---|---|---|---|
| 3,062,801 | 11/1962 | Hoeg et al. | 252—429(B)X |
| 3,072,630 | 1/1963 | De Jong et al. | 252—429(B)X |
| 3,130,003 | 4/1964 | Tornqvist et al. | 252—442X |
| 3,241,913 | 3/1966 | Fowler | 23—87(T) |
| 3,365,434 | 1/1968 | Coover et al. | 252—429(B)X |
| 3,380,981 | 4/1968 | Miller et al. | 252—429(B)X |
| 3,394,118 | 7/1968 | Boor | 252—429(B)X |

PATRICK P. GARVIN, Primary Examiner

U.S. Cl. X.R.

252—429; 260—93.7

UNITED STATES PATENT OFFICE
CERTIFICATE OF CORRECTION

Patent No. 3,560,146    Dated February 2, 1971

Inventor(s) Luciano Luciani et al.

It is certified that error appears in the above-identified patent and that said Letters Patent are hereby corrected as shown below:

Column 3, line 36, "o-chloroben-" should read -- o-dichloroben- --.

Signed and sealed this 11th day of April 1972.

(SEAL)
Attest:

EDWARD M. FLETCHER, JR.          ROBERT GOTTSCHALK
Attesting Officer                Commissioner of Paten